3,028,373
VULCANIZATION OF HALOGENATED RUBBERY COPOLYMER WITH INORGANIC METAL COMPOUND AND A HALOGENATED HYDROCARBON
Leon S. Minckler, Jr., Metuchen, Theodore Lemiszka, Roselle, and Delmer L. Cottle, Highland Park, N.J., assignors to Esso Research and Engineering Company, a corporation of Delaware
No Drawing. Filed Apr. 21, 1959, Ser. No. 807,767
18 Claims. (Cl. 260—85.3)

This invention relates to rubbery polymeric compositions which are halogenated copolymers of isoolefins and multiolefins, and to the preparation and vulcanization of such compositions and more particularly to improved methods for curing halogenated butyl rubber with minor proportions of certain dibromo alkanes or dibromo benzene-type compounds.

Copolymers of the above general type, especially where the copolymer contains about 85 to 99.5% (preferably about 95 to 99.5%) of a $C_4$ to $C_7$ isoolefin such as isobutylene or 2-methyl-1-butene or the like with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR-I rubber (Government Rubber-Isobutylene), and, for example, are referred to as "butyl rubber" in the textbook "Synthetic Rubber" by G. S. Whitby. The preparation of butyl type rubber is described in U.S. Patent 2,356,128 to Thomas et al., as well as in technical literature. In general, the multiolefinic component of the rubber comprises such multiolefins as myrcene, allo-ocimene, or dimethallyl or preferably a conjugated diolefin such as isoprene, butadiene, dimethyl butadiene, piperylene, etc. The reaction product of isobutylene and isoprene is preferred. Butyl rubber has a mole percent unsaturation of between about 0.5 and 15.0.

Halogenated butyl-type rubbery copolymers, which may be vulcanized with zinc oxide and are co-vulcanizable with more highly unsaturated rubbers, are produced by halogenating the butyl rubber in a manner which does not degrade the molecular weight thereof, but halogenated sufficiently to produce a rubbery product which, when vulcanized, retains at least about one third of its tensile strength upon heat aging.

It has now been discovered that halogenated butyl rubber may be cured to produce vulcanizates exhibiting improvements in extension modulus, tensile strength upon heat aging, dynamic drift and permanent set by vulcanizing the halogenated butyl rubber with a combination of a zinc-containing compound and/or a stannous-tin-containing compound and a $C_2$ to $C_{24}$, preferably a $C_3$ to $C_{12}$ dibromo alkane and/or a $C_6$ to $C_{18}$, preferably a $C_6$ to $C_{12}$ dibromo benzene or $C_8$ to $C_{18}$, preferably a $C_8$ to $C_{12}$ dibromo alkyl benzene.

In practicing the present invention, 100 parts by weight of halogenated butyl rubber are compounded with about 0.2 to 30, advantageously about 0.5 to 20 and preferably about 1.0 to 15.0 parts by weight of a zinc or stannous-tin-containing compound and about 0.1 to 20, advantageously about 0.3 to 15 and preferably about 0.5 to 10.0 parts by weight of a dibromo alkane, benzene or alkyl-benzene, with the optional addition of such conventional compounding agents as about 20 to 100 parts by weight of fillers such as clays or carbon blacks, antioxidants such as phenyl-beta-naphthylamine, antitack agents such as stearic acid, resins, plasticizers, etc. The resulting compounded stock is then cured by heating the same for about 1 minute to 5 hours, advantageously for about 5 minutes to 3 hours and preferably for about 15 minutes to 2 hours at a temperature level of between about 200° to 400° F. and preferably at about 275° to 375° F. to produce vulcanizates having a combination of high extension moduli, high tensile strengths upon heat aging, low dynamic drift and low permanent set.

For the purposes of the present invention, the zinc or stannous-tin-containing compounds may comprise such materials as zinc or stannous oxide, zinc or stannous carboxylates such as stearates or naphthenates, zinc or stannous chlorides, zinc or stannous sulfides, and/or zinc or stannous thiocarbamates such as zinc or stannous dimethyl, diethyl, diisopropyl or dibutyl dithiocarbamates. The preferred metal compounds are stannous chloride and/or especially zinc oxide.

Particularly useful dibromo alkanes, benzenes or alkyl benzenes, for the purposes of the present invention, include, among others: 1,4-dibromobutane; 1,10- dibromo decane; 1,4-dibromo-benzene; 2,5-dibromo methyl benzene; 1,4-di-(bromo methyl) benzene, mixtures thereof, etc.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100-L)M_1 + L(M_2 + M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of halogen.

Restated, there should be at least about 0.5 weight percent of combined halogen in the polymer but not more than about one atom of fluorine or chlorine or 3 atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, iodine monochloride, hydrogen fluoride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, tri-bromo-phenol bromide, N-chloroacetamide, N,N'-dimethyl-5,5 dichloro or dibromo hydantoin, and other common halogenating agents.

The halogenation is generally conducted at about $-50°$ to about $+200°$ C., advantageously at above about 0° to 65° C., preferably at about 20° to 50° C. (room temperature generally being satisfactory), depending upon the particular halogenating agent, for about one minute to several hours. The pressure range is not critical and may vary from about 0.5 to 400 p.s.i.a.; atmospheric pressure being satisfactory. The halogenation conditions are regulated to halogenate the rubbery copolymer to the extent above-mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

HALOGENATED BUTYL RUBBERS "B" TO "L"

Other examples of halogenated isoolefin-multiolefin copolymers which may be used are tabulated hereinafter, the amount of isoolefin and multiolefin in copolymer, halogenation agent, and amount of halogen combined in the copolymer being as follows:

| Halogenated Rubber | Isoolefin (percent)[1] | Multiolefin (percent)[1] | Halogenation Agent | (Percent) Halogen in the Rubber[1] |
|---|---|---|---|---|
| B | Isobutylene (98) | Isoprene (2) | $SO_2Cl_2$ | 1.2 chlorine. |
| C | Isobutylene (95) | Isoprene (5.0) | $Cl_2$ in $CCl_4$ | 2.5 chlorine. |
| D | Isobutylene (94) | Cyclopentadiene (6) | $Cl_2$ in $CCl_4$ | 2.0 chlorine. |
| E | Isobutylene (92) | Myrcene (8.0) | Hydrogen fluoride | 0.9 fluorine. |
| F | 2-methylbutene-1 (95) | Isoprene (5.0) | $Cl_2$ in Hexane | 1.5 chlorine. |
| G | 3-methylbutene-1 (96) | Butadiene (4.0) | Iodine monochloride | 1.6 iodine. |
| H | Isobutylene (98) | 1-vinyl cyclohexene (2.0) | N-bromo succinimide | 1.2 bromine. |
| I | Isobutylene (92) | Butadiene (8.0) | Gaseous chlorine | 2.8 chlorine. |
| J | Isobutylene (85) | Isoprene (15) | Gaseous chlorine | 6.6 chlorine. |
| K | Isobutylene (98) | Isoprene (2.0) | N,N'-dichloro-5,5-dimethyl hydantoin | 1.1 chlorine. |
| L | Isobutylene (98) | Isoprene (2.0) | Liquid bromine | 2.3 bromine. |

[1] Note.—(Percent) in all instances is percent by weight.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added and reacted for 30 minutes with the polymer at room temperature. The resulting chlorinated copolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were good.

CHLORINATED BUTYL RUBBER "M"

An additional run was made chlorinating a commercial isobutylene-isoprene butyl rubber copolymer dissolved in benzene. The butyl rubber had a Mooney viscosity at 212° F. for 8 minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of ½ hour at a temperature level of 30° C. and under atmospheric pressure. The chlorine was added to the reactor through the conduit via the sparger ring. The chlorination was then terminated and the solution containing the chlorinated butyl rubber formed was agitated for an additional 20 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds | Composition of Chlorinated product, Percent |
|---|---|---|
| Butyl rubber | 170 | 98.65 |
| Benzene solvent | 1,540 |  |
| Chlorine | 4.8 (i.e., 2.8%) | 1.35 |

The resulting water-washed solution containing the stabilized, chlorinated butyl rubber "M" was then recovered by injecting the solution into an agitated aqueous slurry containing zinc stearate and a small amount of a non-ionic wetting agent of the aliphatic polyoxyethylene ether type (e.g., Sterox AJ or Tergitol NPX) in an amount of 0.7 pound of the zinc stearate per 100 pounds of chlorinated butyl rubber as a dispersing aid. The agitated solution was maintained at a temperature between about 190° and 210° F. (e.g., 200° F.) whereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for 12 hours. The crumb depth on the tray was about ½ inch. The crumb was then completely dried and compacted by milling for 15 minutes on a conventional rubber mill having a roll temperature of 260° F. (i.e., 127° C.).

*Example I*

One hundred parts by weight of a chlorinated butyl rubber having a Mooney viscosity (212° F. for 8 minutes) of 65, a mole percent unsaturation of 1.3, a viscosity average molecular weight of 475,000 and a combined chlorine content of 1.1 weight percent were compounded with 50 parts by weight of HAF carbon black, 1.0 part by weight of stearic acid and 5.0 parts by weight of zinc oxide, with and without the addition of 5 parts by weight of various dibromo alkanes, with the following results upon curing at 307° F. for 45 minutes:

| Component | Parts by weight | | |
|---|---|---|---|
| | Sample A | Sample B | Sample C |
| Zinc Oxide | 5.0 | 5.0 | 5.0 |
| 1,4-dibromobutane | | 5.0 | |
| 1,10-dibromodecane | | | 5.0 |
| Physical Properties: | | | |
| 300% Modulus (p.s.i.) | 1,280 | 1,500 | 1,500 |
| Tensile Strength (p.s.i.) | 1,910 | 1,885 | 2,050 |
| Elongation (percent) | 425 | 385 | 410 |
| Goodrich Flexometer Data: | | | |
| Dynamic Drift (Percent) | 3.6 | 0.9 | 1.2 |
| Permanent set (Percent) | 5.8 | 2.9 | 3.2 |
| Tensile Strength after heat aging 48 hours @ 307° F | 745 | 1,085 | 1,445 |

The above data show that the zinc oxide cure of chlorinated butyl rubber is improved by the inclusion in the curing formulation of two typical dibromo alkanes. More particularly, the inclusion of dibromo alkanes resulated in vulcanizates having higher extension moduli, lower dynamic drift and permanent set, and better tensile strength after heat aging.

*Example II*

The same general procedure as in Example I was repeated except that the dibromo alkyl benzene "1,4-di-(bromomethyl) benzene" was used and the halogenated butyl rubber was a brominated butyl rubber having a Mooney viscosity (212° F. for 8 minutes) of 66, a mole percent unsaturation of 0.7, a viscosity average molecular weight of 476,000, and a combined bromine content of 2.15 weight percent. The cure was at 307° F. for 30 minutes with the following results:

| Component | Parts by weight | |
|---|---|---|
| | Sample D | Sample E |
| Zinc oxide | 5.0 | 5.0 |
| 1,4-di-(bromomethyl) benzene | 5.0 | |
| Physical Properties: | | |
| 300% Modulus (p.s.i.) | 1,900 | 1,380 |
| Tensile Strength (p.s.i.) | 2,320 | 2,350 |
| Elongation (Percent) | 370 | 450 |
| Goodrich Flexometer Data: | | |
| Dynamic Drift (Percent) | 2.1 | 4.7 |
| Permanent Set (Percent) | 2.2 | 5.3 |

The above data show that the zinc oxide cure of brominated butyl rubber is improved by the inclusion in the curing formulation of a dibromo alkyl benzene, the resulting vulcanizate having improved extension modulus and lower dynamic drift and permanent set.

Resort may be had to modifications and variations of the disclosed embodiments without departing from the spirit of the invention or the scope of the appended claims.

What is claimed is:

1. A composition comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin, said halogenated copolymer containing at least 0.5 weight percent combined halogen but no more than 3 atoms of combined halogen per double bond in the copolymer and a minor proportion of an admixture of a single metal compound selected from the group consisting of the oxides and chlorides of zinc and stannous tin and a dibromo compound selected from the group consisting of $C_2$ to $C_{24}$ dibromo alkanes and $C_8$ to $C_{18}$ dibromoalkyl benzenes.

2. A composition according to claim 1 in which the halogenated copolymer is selected from the group consisting of those containing at least 0.5 weight percent chlorine but not more than about one atom of chlorine per double bond in the copolymer, those containing at least about 0.5 weight percent bromine but not more than about three combined atoms of bromine per double bond in the copolymer, and mixtures thereof.

3. A composition according to claim 1 in which the metal compound is present in an amount of between about 0.5 and 20 weight percent based on halogenated copolymer, the dibromo compound being present in an amount of between about 0.1 and 15.0 weight percent, on the same basis.

4. A composition according to claim 1 in which the metal compound is zinc oxide.

5. A composition according to claim 1 in which the dibromo compound is 1,4-dibromobutane.

6. A composition according to claim 1 in which the dibromo compound is 1,10-dibromodecane.

7. A composition according to claim 1 in which the dibromo compound is 1,4-dibromobenzene.

8. A composition according to claim 1 in which the dibromo compound is 1,4-di-(bromomethyl) benzene.

9. A composition according to claim 1 in which the dibromo compound is 2,5-dibromo methyl benzene.

10. A composition comprising a rubbery polymer of about 85 to 99.5 weight percent of a $C_4$ to $C_7$ isoolefin and 15 to 0.5 weight percent of a $C_4$ to $C_{14}$ multiolefin, said polymer having a viscosity average molecular weight of at least about 100,000 and comprising atoms of hydrogen, carbon and a halogen selected from the group consisting of fluorine, bromine, chlorine, and iodine and mixtures thereof, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen selected from the group consisting of fluorine, bromine, chlorine, and iodine and mixtures thereof but not more than about one combined atom of halogen per double bond in the polymer; said polymer being in composition with a vulcanizing amount of an admixture of zinc oxide and a dibromo compound selected from the group consisting of $C_2$ to $C_{24}$ dibromoalkanes and, $C_8$ to $C_{18}$ dibromoalkyl benzenes.

11. A composition according to claim 10 in which the zinc oxide is present in an amount of between about 1.0 and 15.0 weight percent based on the halogen-containing polymer, the dibromo compound being present in an amount of between about 0.5 and 10.0 weight percent, on the same basis.

12. A process which comprises vulcanizing halogenated butyl rubber copolymer of about 85 to 99.5 weight percent of a $C_4$ to $C_7$ isoolefin and 15 to 0.5 weight percent of a $C_4$ to $C_{14}$ multiolefin, said copolymer containing at least 0.5 weight percent combined halogen but no more than 3 atoms of combined halogen per double bond in the butyl rubber in the presence of an admixture of about 0.5 to 20.0 weight percent of a single metal compound selected from the group consisting of oxides and chlorides of zinc and stannous tin and about 0.1 to 15.0 weight percent of a dibromo compound selected from the group consisting of $C_2$ to $C_{24}$ dibromoalkanes and $C_8$ to $C_{18}$ dibromoalkyl benzenes at a temperature level of between about 200° and 400° F. until the resulting vulcanizate exhibits a tensile strength upon heat aging of at least about 1000 p.s.i., an extension modulus at 300% elongation of at least about 1500 p.s.i., a dynamic drift of not more than about 2.5 and a permanent set of not more than about 4.0%.

13. A process according to claim 12 in which the halogenated butyl rubber contains a member selected from the group consisting of fluorine, iodine, bromine, chlorine and mixtures thereof.

14. A composition consisting essentially of a major proportion of a rubbery halogenated copolymer of 85 to 99.5 wt. percent of a $C_4$ to $C_7$ isoolefin and about 15 to 0.5 wt. percent of a $C_4$ to $C_{14}$ multiolefin, said halogenated copolymer containing at least 0.5 wt. percent combined halogen but no more than 3 atoms of combined halogen per double bond in the copolymer, and a minor proportion of an admixture of a single metal compound selected from the group consisting of the oxides and chlorides of zinc and stannous tin and 1,4-dibromobutane.

15. A composition consisting essentially of a major proportion of a rubbery halogenated copolymer of 85 to 99.5 wt. percent of a $C_4$ to $C_7$ isoolefin and about 15 to 0.5 wt. percent of a $C_4$ to $C_{14}$ multiolefin, said halogenated copolymer containing at least 0.5 wt. percent combined halogen but no more than 3 atoms of combined halogen per double bond in the copolymer, and a minor proportion of an admixture of a single metal compound selected from the group consisting of the oxides and chlorides of zinc and stannous tin and 1,10-dibromodecane.

16. A composition consisting essentially of a major proportion of a rubbery halogenated copolymer of 85 to 99.5 wt. percent of a $C_4$ to $C_7$ isoolefin and about 15 to 0.5 wt. percent of a $C_4$ to $C_{14}$ multiolefin, said halogenated copolymer containing at least 0.5 wt. percent combined halogen but no more than 3 atoms of combined halogen per double bond in the copolymer, and a minor proportion of an admixture of a single metal compound selected from the group consisting of the oxides and chlorides of zinc and stannous tin and 1,4-dibromobenzene.

17. A composition consisting essentially of a major proportion of a rubbery halogenated copolymer of 85 to 99.5 wt. percent of a $C_4$ to $C_7$ isoolefin and about 15 to 0.5 wt. percent of a $C_4$ to $C_{14}$ multiolefin, said halogenated copolymer containing at least 0.5 wt. percent combined halogen but no more than 3 atoms of combined halogen per double bond in the copolymer, and a minor proportion of an admixture of a single metal compound selected from the group consisting of the oxides and chlorides of zinc and stannous tin and 1,4-di-(bromomethyl) benzene.

18. A composition consisting essentially of a major proportion of a rubbery halogenated copolymer of 85 to 99.5 wt. percent of a $C_4$ to $C_7$ isoolefin and about 15 to 0.5 wt. percent of a $C_4$ to $C_{14}$ multiolefin, said halogenated copolymer containing at least 0.5 wt. percent combined halogen but no more than 3 atoms of combined halogen per double bond in the copolymer, and a minor proportion of an admixture of a single metal compound selected from the group consisting of the oxides and chlorides of zinc and stannous tin and 2,5-dibromo methyl benzene.

References Cited in the file of this patent

UNITED STATES PATENTS

| | | |
|---|---|---|
| 2,504,295 | Beaver | Apr. 18, 1950 |
| 2,567,135 | Sturgis | Sept. 4, 1951 |